United States Patent [19]

Marinus

[11] Patent Number: 4,694,385

[45] Date of Patent: Sep. 15, 1987

[54] SWITCHED-MODE POWER SUPPLY WITH DELAY NETWORK TO REDUCE SWITCHING LOSSES

[75] Inventor: Antonius A. Marinus, Eindhoven, Netherlands

[73] Assignee: U.S. Philips Corporation, New York, N.Y.

[21] Appl. No.: 890,593

[22] Filed: Jul. 30, 1986

[30] Foreign Application Priority Data

Aug. 26, 1985 [NL] Netherlands ............... 8502339

[51] Int. Cl.⁴ .................................. H02M 3/335
[52] U.S. Cl. .................................. 363/19; 363/18
[58] Field of Search ................ 363/18, 19, 21

[56] References Cited

U.S. PATENT DOCUMENTS

| | | | |
|---|---|---|---|
| 4,183,080 | 1/1980 | Liebman | 363/18 |
| 4,276,586 | 6/1981 | Boekhorst | 363/21 |
| 4,438,485 | 3/1984 | Voigt | 363/21 |
| 4,486,822 | 12/1984 | Marinus | 363/19 |
| 4,488,210 | 12/1984 | Shono | 363/19 |

Primary Examiner—Patrick R. Salce
Assistant Examiner—Jeffrey Sterrett
Attorney, Agent, or Firm—Robert T. Mayer; Bernard Franzblau

[57] ABSTRACT

A switched-mode power supply circuit for converting a d.c. input voltage into a d.c. output voltage. The circuit includes a controllable power switch (Tr1) connected in series with the primary winding (L1) of a transformer (T). This winding forms part of a resonant circuit. To reduce the power losses caused by turning on the switch, the drive path of the switch incorporates a delay network (R11, C9) for each time delaying the turn-on until an instant which is substantially half a cycle of the resonance frequency later than the initial instant of the decrease of the voltage across the switch during its previous cut-off time.

12 Claims, 3 Drawing Figures

SWITCHED-MODE POWER SUPPLY WITH DELAY NETWORK TO REDUCE SWITCHING LOSSES

BACKGROUND OF THE INVENTION

This invention relates to a switched-mode power supply circuit for converting a d.c. input voltage into a d.c. output voltage, including a controllable power switch arranged in series with the primary winding of a transformer. The series arrangement thus formed is coupled to the input voltage terminals. The transformer has a secondary winding to which a rectifier is coupled for providing the output voltage. The primary winding forms part of a resonant circuit when the switch and rectifier pass no current. A drive circuit including a delay network is connected to a control electrode of the switch for each time initiating turn-off of the switch, whereafter the voltage across the switch increases to a given value and substantially maintains said value. The said voltage then decreases in accordance with an oscillation at the resonance frequency. The drive circuit each time initiates turn-on of the switch, whereafter the voltage across the switch is substantially zero.

A power supply circuit of this type is known from U.S. Pat. No. 4,183,080. It is a self-oscillating circuit in which the drive circuit for the power switch, which is a switching transistor, includes a secondary winding of the transformer, which secondary winding is coupled with the primary winding to provide a positive feedback. A network for rendering the transistor conductive and for maintaining this state is incorporated between the said secondary winding and the base of the transistor. For turning off the transistor, the drive circuit includes a delay network connected to the same winding and a drive transistor whose main path is arranged in parallel with the base/emitter junction of the switching transistor. At an instant determined by the delay network the drive transistor begins to conduct so that the switching transistor is rapidly rendered non-conductive. In this manner the turn-off losses of this transistor are reduced, more specifically because of the short duration of the turn-off process. The conducting time of the drive transistor is very short. Together with parasitic capacitances the primary winding constitutes a resonant circuit.

SUMMARY OF THE INVENTION

The invention is based on the perception that means can be used in such a power supply circuit which are similar to those used in the said known circuit for reducing the turn-on losses of the power switch. To this end the power supply circuit according to the invention is characterized in that the delay network is coupled to the control electrode of the power switch for each time adjusting the turn-on of said switch at an instant which is substantially half a cycle of the resonance frequency later than the initial instant of the decrease of the voltage across the switch during its previous cut-off time.

Due to this measure it is ensured that the turn-on of the power switch is initiated at an instat when the voltage across the switch is at a minimum after having been fairly high. Consequently, a considerable reduction in the turn-on losses is obtained relative to the prior art circuits in which turn-on is effected at an instant which is determined by the properties of the circuit, i.e. in the case of the circuit in the said U.S. patent by the positive feedback, no deliberate choice being made for the said instant for obtaining a low turn-on dissipation.

A power supply circuit in which the delay network is coupled to the control electrode of a second switch which is conducting at the end of the conducting period of the power switch for initiating the turn-off of said power switch may advantageously be characterized by means for each time rendering the second switch conductive substantially at the initial instant of the decrease of the voltage across the power switch and for subsequently maintaining the second switch in the conducting state during substantially half a cycle of the resonance frequency after the said instant. In this manner the second switch has a second function, which is cost-saving.

Since an object the delay network in the drive circuit according to the invention is to delay the turn-on instant, this network cannot be connected in the same manner as is the case in the said U.S. patent. A power supply circuit in which the delay network is connected to a further secondary winding of the transformer is characterized in that, during operation, the voltage at the junction of the delay network and the said further secondary winding has the same polarity as the voltage at the junction of the primary winding and the power switch.

BRIEF DESCRIPTION OF THE DRAWINGS

The invention will be further described by way of example with reference to the accompanying drawing in which:

The self-oscillating power supply circuit of FIG. 1 comprises an npn power switching transistor Tr1 whose collector is connected to the primary winding L1 of a transformer T, while the emitter is connected to ground. The other end of winding L1 is connected to the positive rail of an unstabilized voltage supply source $V_B$ whose negative rail is also connected to ground and which is, for example, a mains rectifier. The turn-on path of transistor Tr1, which is connected to the base of the transistor and the other end of which is connected to ground, comprises a capacitor C1, a feedback winding L2 of transformer T, a diode D1 and a resistor R1. The base current flowing during the conducting period of transistor Tr1 produces a negative voltage across capacitor C1. The turn-off path of transistor Tr1, which is likewise connected to the base thereof, comprises capacitor C1, the emitter-collector path of a pnp transistor Tr2 having a base-emitter resistor R2, and an inductance L3. Upon turn-off a reverse base current of transistor Tr1 flows through elements C1, Tr2 and L3 so that the charge carriers stored in this transistor during the conducting period are removed. With the aid of a further winding L4 of transformer T and a diode D2 a negative voltage for capacitor C1 is generated in case the forward base current of transistor Tr1 flows for too short a time under given circumstances to build up a sufficiently constant voltage across capacitor C1. In FIG. 1 the winding sense of the windings of transformer T is indicated by means of dots.

One end of a winding L5 of transformer T is connected to a diode D3 the other end of which is connected to the series network of a resistor R3 and a capacitor C2. Winding L5 has such a winding sense and diode D3 has such a conductivity direction that a charge current for capacitor C2 flows through resistor R3 during the conducting period of transistor Tr1. The other end of capacitor C2 is connected to the junction of capacitor C1, winding L2 and the collector of transistor Tr2. With respect to the d.c. voltage level present at this junction a sawtooth voltage is produced across capacitor C2 which voltage is passed on via an RC parallel network R4, C3 to the base of an npn transistor Tr4. The emitter of transistor Tr4 is connected to the said junction, while the collector is connected to the base of transistor Tr2. At a given instant the voltage at the base of transistor Tr4 reaches a value at which the transistor is rendered conducting. As a result transistor Tr2 is also rendered conducting. The voltage at the emitter of this transistor assumes substantially the same value as the negative voltage of approximately $-5$ V which is present across capacitor C1, which initiates the turn-off of transistor Tr1. During the period of time when transistor Tr1 is non-conductive capacitor C2 is discharged via a resistor R5, a diode D4 and winding L4 while a reverse current flows through transistor Tr2 which current also flows through resistor R1 and through a capacitor C4 which is arranged in parallel with diode D1.

A starting resistor R6 having a high value is arranged between the positive rail of source $V_B$ and the base of transistor Tr2. When the circuit is turned on a current flows through resistors R6 and R2 which also flows through capacitor C4 and winding L2 so that energy is built up in transformer T. Due to this current the voltage at the base of transistor Tr1 increases until a value is reached at which the transistor becomes conductive. Also during normal operation a current flows through resistor R6, but its value is too low to have a noticeable influence on the behaviour of the circuit.

Figure 1:
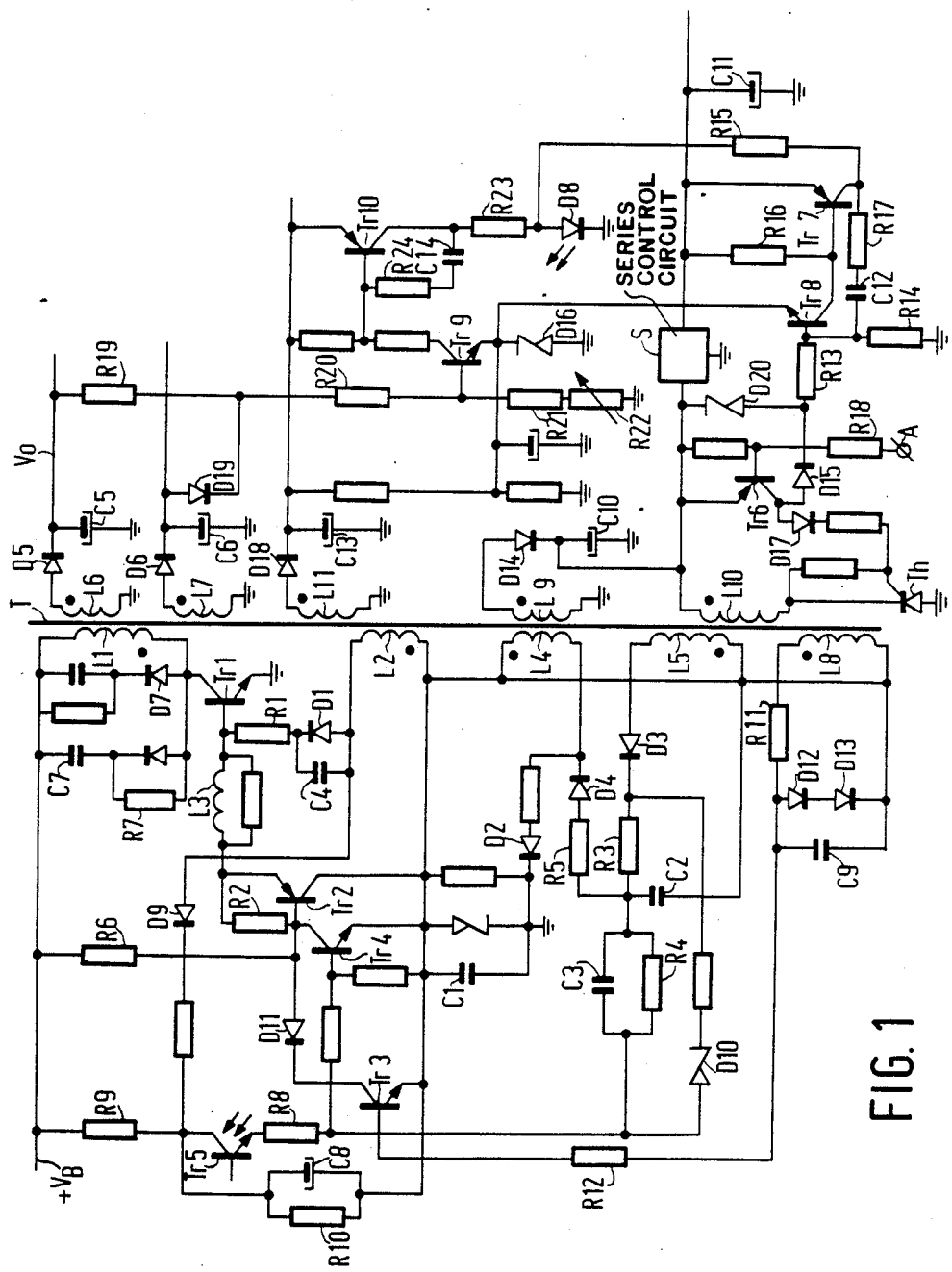
FIG. 1 is a basic circuit diagram of a power supply circuit according to the invention.

Secondary windings are provided on the core of transformer T. FIG. 1 shows a number of these windings, for example, L6 and L7. When transistor Tr1 is turned off, a current recharging smoothing capacitors C5 and C6 through rectifiers, for example, D5 and D6, respectively, flows through each secondary winding. The other ends of capacitors C5 and C6 are connected to ground. The voltages across these capacitors are the output voltages of the supply circuit for loads connectable thereto. These loads, which are not shown in FIG. 1, are, for example, parts of a television receiver.

A network with a tuning capacitor C7 and a damp resistor R7, as well as a clamping network with a diode D7 is arranged in parallel with winding L1. Winding L1 and capacitor C7, as well as parasitic capacitances, constitute a resonant circuit in which an oscillation is produced in the intervals when no current flows through transistor Tr1 and rectifiers D5 and D6. Parasitic oscillations which might be produced during the period of time when transistor Tr1 is non-conductive are reduced by means of the said clamping network.

By controlling the conducting periods of transistor Tr1, the output voltages of the supply circuit are maintained substantially constant in spite of variations of the voltage $V_B$ and/or of the loads. For this purpose the circuit includes a light-emitting diode D8 which is optically coupled to a light-sensitive npn transistor Tr5 having an emitter resistor R8 which is connected in the base lead of transistor Tr4 along with the network R4, C3. A collector resistor R9 is connected to the source $V_B$ and the base is unconnected. The collector of transistor Tr5 is also connected via an RC parallel network R10, C8 to the junction of windings L2 and L4 and capacitor C1 and via a diode D9 to the junction of winding L2 and diode D1. A positive voltage is thus present at the said collector. If the current through diode D8 varies in a manner to be explained hereinafter, the emitter current of transistor Tr5 also varies. An increase thereof, for example, involves an increase in the voltage at the base of transistor Tr4 so that transistor Tr1 is turned off at an earlier instant than would otherwise be the case. The final value of collector current of transistor Tr1 is thus lower, resulting in the output voltages of the circuit also being lower. By means of a network including a Zener diode D10 which is connected between the junction of resistor R4 and R8 and the junction of resistor R3 and diode D3, this control is also dependent on variations of the voltage $V_B$.

Figure 2:
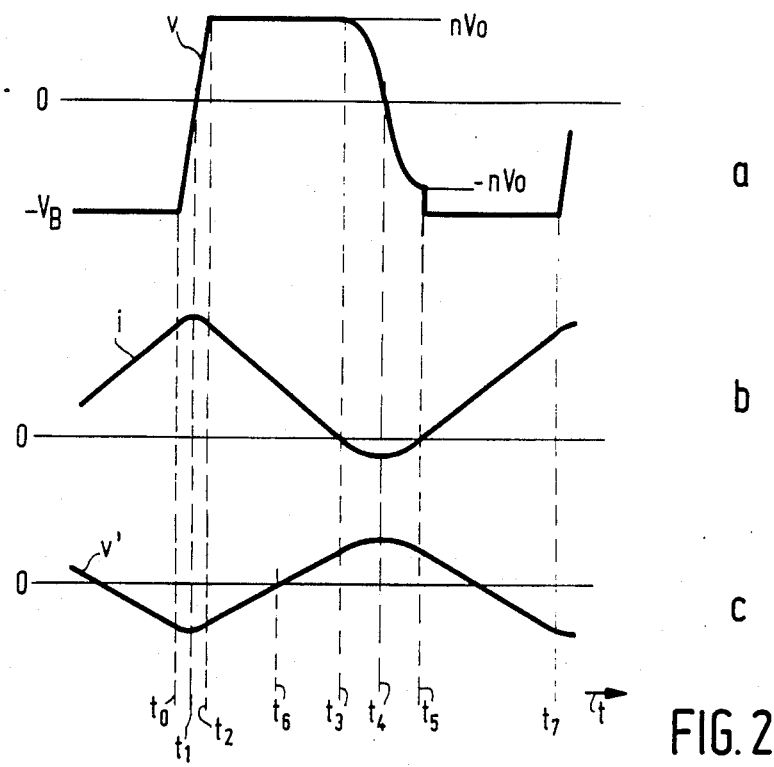
FIG. 2 shows the wave forms occurring therein.

The foregoing is well known to those skilled in the art and does not need any further explanation. Further details will therefore not be discussed. The same applies to safety precautions against overvoltages and overcurrents, formed in known manner. For a better understanding of the invention, FIG. 2 shows some idealized waveforms. FIG. 2a shows the variation as a function of time of the voltage v across winding L1, i.e. the same variation but for a d.c. level, more specifically that of source $V_B$, as that of the voltage at the collector of transistor Tr1, and FIG. 2b shows the variation of the current i flowing through winding L1.

Transistor Tr1 is turned off at an instant $t_o$. Before this instant the current i increases linearly, while voltage v has the value $-V_B$. After instant $t_o$ voltage v increases in accordance with a sine function of time, whereas current i varies in accordance with a cosine function. At an instant $t_1$ voltage v reaches the zero value and current i is at a maximum. Voltage v continues to increase until the value is reached at an instant $t_2$ when the rectifiers on the secondary side start conducting. If the voltage across capacitor C5 is equal to $V_o$ and if the transformation ratio of windings L1 and L6 is n:1, voltage v remains equal to $nV_o$ after instant $t_2$, whereas current i decreases linearly, more specifically until the zero value is reached at an instant $t_3$. After the instant $t_3$ the rectifiers are currentless, while voltage v decreases in accordance with a sine function at the same resonance frequency as between instants $t_o$ and $t_2$, but at a lower peak value, being $nV_o$, while current i becomes negative. Current i flows to capacitor C7 and varies in accordance with a cosine function. Without any further measures a current would thus be produced in winding L2 which would flow through diode D1 to the base of transistor Tr1. FIGS. 1 and 2a show that transistor Tr1 would thereby be rendered conducting at an instant after instant $t_3$ when the sum of the voltage across winding L2 and the voltage across capacitors C1 and C4 will be lower than the base-emitter threshold voltage of the transistor. This instant occurs shortly after instant $t_3$ before voltage v becomes zero, i.e. upon turning on, the voltage at the collector of transistor Tr1 would be slightly lower than the value $V_B+nV_o$.

The turn-off losses of transistor Tr1 are reduced in known manner by incorporating inductance L3 in the base lead. The superfluous charge carriers of the transistor are thereby slowly removed, while the collector current continues to flow, more specifically until the moment when the transistor comes out of its saturated state resulting in a very rapid decrease to zero of the collector current. For turning on it appears from the foregoing that without any further measures the voltage at the collector of transistor Tr1 is fairly high upon turn-on which causes a considerable switching dissipation in transistor Tr1 and in resistor R7. To reduce the turn-on losses the circuit of FIG. 1 includes an npn transistor Tr3 whose emitter is connected to the junction of capacitor C1 and winding L2 and whose collector is connected to the base of transistor Tr2 via a diode D11 which has the same conductivity direction as the collector-emitter path of transistor Tr3. A winding L8 of transformer T is connected at one end to the emitter of transistor Tr3 and at the other end to an integrating network consisting of a resistor R11 and a capacitor C9, said capacitor being arranged between resistor R11 and the said emitter. The junction of capacitor C9 and resistor R11 is connected via a limiting resistor R12 to the base of transistor Tr3. The winding sense of winding L8 is such that the voltage at the junction of resistor R11 has the same polarity as the voltage indicated in FIG. 2a, i.e. the voltage under consideration is negative before instant $t_1$ and positive after this instant. Under these circumstances the voltage v' across the capacitor C9 which is proportional to the integral of the voltage at the last-mentioned junction has the same time variation as current i in FIG. 2b but a polarity which is opposed thereto. In fact, current i is proportional to the integral of voltage v.

FIG. 2c shows the variation of voltage v'. Since both the voltage across winding L8 and the current through capacitor C9 have a mean value of zero over one oscillation period, the mean value of voltage v' is also zero. This means that voltage v' reverses its polarity and becomes positive at an instant $t_6$ which is located earlier than instant $t_3$. The time constant of the RC network R11, C9 is chosen so that voltage v' exceeds the value of the base-emitter threshold voltage of transistor Tr3 after instant $t_3$. This shows that this transistor conducts after instant $t_3$ and maintains transistor Tr1 in the non-conducting state in the same manner as transistor Tr4 does at instant $t_o$, more specifically because transistor Tr2 conducts. Since the base of transistor Tr1 carries a negative voltage via the conducting transistor Tr2, while the voltage at the base of transistor Tr3 is positive, a current would flow through the base-collector diode of transistor Tr3 which would cause a distortion of the waveforms. This is prevented by diode D11.

At an instant $t_4$ which is located one fourth of the resonance period of the winding L1 and capacitor C7 later than instant $t_3$, voltage v becomes zero while current i reaches a minimum value, and at an instant $t_5$ voltage v reaches a minimum value, while current i again becomes zero and subsequently becomes positive. Instants $t_3$ and $t_5$ are symmetrical relative to instant $t_4$ so that the minimum value of voltage v is substantially equal to $-nV_o$, while the minimum value of the voltage at the collector of transistor Tr1 is substantially equal to $V_B-nV_o$. Due to the symmetry voltage v' decreases to a lower value than the threshold voltage of transistor Tr3 after instant $t_5$ so that this transistor is rendered non-conducting. The voltage at the base of transistor Tr2 becomes positive so that this transistor also becomes non-conducting resulting in transistor Tr1 being rendered conducting. The voltage at its collector then becomes substantially zero and consequently voltage v becomes equal to $-V_B$. This state is maintained while current i increases linearly until transistor Tr1 is rendered non-conducting again under the influence of the control, more specifically at an instant $t_7$ which is one oscillation period later than instant $t_o$ whereafter the variation described is repeated.

It is evident from the foregoing that due to the operation of transistor Tr3 the turn-on instant of transistor Tr1 is delayed until the instant $t_5$ when the voltage at the collector of transistor Tr1 has a minimum value, which involves a considerable saving in energy and is favourable for the life of the transistor. Consequently a known measure for slightly reducing the turn-on losses may be omitted, namely the selection of a low value for the capacitance of capacitor C7 which is arranged in parallel with winding L1. Since this capacitance is now higher than is the case in the prior art, a reduction of the turn-off losses is also obtained because the turn-off duration is shorter, while the resonance frequency of the circuit with winding L1 decreases so that less high frequency radiation is caused. When transistor Tr1 is turned off, parasitic oscillations with a smaller amplitude and a lower frequency occur at the collector than would otherwise be the case so that the clamping circuit with diode D7 may be omitted in most cases.

It will be obvious that the delay must be fairly accurate because voltage v before and after instant $t_5$ is higher than the minimum value at this instant. In this respect an improvement is obtained by series arranging two diodes D12 and D13 with the same conductivity directions. This diode arrangement is in parallel with capacitor C9 and the anode of diode D12 is connected to the junction of elements R11, R12 and C9. Consequently the maximum value of voltage v' at the instant $t_4$ is approximately equal to twice a diode threshold voltage, i.e. approximately 1.4 V. The maximum value of the base-emitter voltage of transistor Tr3 is therefore equal to one threshold voltage, more specifically during a given time interval commencing before instant $t_4$ and ending after this instant. The circuit may be dimensioned in such a manner that this interval substantially coincides with the period between instants $t_3$ and $t_5$. In one embodiment of the delay circuit the resistors R11 and R12 had values of approximately 8.2 and 2.2 k$\Omega$, respectively, while the capacitance of capacitor C9 was approximately 4.7 nF. The frequency of the oscillation, i.e. the inverse of the period between instants $t_o$ and $t_7$, could vary between 25 and 60 kHz. It should also be noted that the turn-on instant of transistor Tr1 cannot be adjusted at instant $t_5$ by means of a d.c. voltage level in the base lead of the transistor so that at first sight a delay could be obtained. In fact, such a delay would have to be so high that the supply circuit in the loaded state would not be able to build up a considerable output voltage because the conductivity periods of transistor Tr1 would be very short relative to the oscillation period. Therefore, the delay circuit as described is a better solution. Of the possible embodiments the embodiment of FIG. 1, namely with integration, is preferred because voltage v' is an image of the current i, but for the polarity, so that the maximum value of voltage v' occurs at instant $t_4$ resulting in the conductivity period of transistor Tr3 being symmetrical relative to this instant.

The foregoing description applies to the case where the supply circuit is dimensioned in a manner such that voltage $V_B$ is lower than $nV_o$, in which case the minimum value of the voltage at the collector of transistor Tr1 just before the transistor is turned on is positive. In the opposite case the said voltage becomes zero at an instant which is located earlier than instant $t_5$ whereafter a reverse current flows through the base-collector diode of transistor Tr1 while the said voltage is negative. At instant $t_5$ this current is switched off in the same manner as described above. If necessary, a diode may be arranged in parallel with the collector-emitter path of transistor Tr1, which diode has its conductivity direction opposed to this path and through which the reverse current flows. To ensure that no reverse current flows through the transistor, a diode may be arranged in series with the transistor and with the same conductivity direction as this transistor, while the anti-parallel diode is arranged between the junction of the series diode with winding L1 and ground. It will be noted that the dissipation caused by the reverse current is smaller in this case (because the voltage at the collector is maintained at a low value by the conducting anti-parallel diode) than the dissipation caused by the forward current in FIG. 2, which is many times larger, namely proportional to $\frac{1}{2}Cv^2$ and to the oscillation frequency. In this case C is the capacitance which is effectively in parallel with transistor Tr1. In addition the said reverse current returns to the source $V_B$.

The series arrangement of a diode D14 and a capacitor C10 is connected to a secondary winding L9 of transformer T, the anode of diode D14 being connected to the end of winding L9 which is not connected to ground. One end of a further secondary winding L10 of transformer T, which has more turns than winding L9, is connected to the junction of diode D14 and capacitor C10 and the other end is connected to the cathode of a thyristor Th. The anode of thyristor Th is connected to ground. A series arrangement constituted by the emitter-collector path of a pnp transistor Tr6, a diode D15 and a voltage divider consisting of two resistors R13 and R14 is arranged in parallel with capacitor C10. The emitter of transistor Tr6 is connected to the input of a series control circuit S the output voltage of which is smoothed by means of a capacitor C11. The series arrangement of the emitter-collector path of a pnp transistor Tr7, a resistor R15 and the above-mentioned light-emitting diode D8 is arranged in parallel with capacitor C11. The base of an npn transistor Tr8 is connected to the junction of resistors R13 and R14, while the collector is connected to the base of transistor Tr7 and to a resistor R16 and the emitter is connected to the cathode of a Zener diode D16 the other end of which is connected to ground. The other end of resistor R16 is connected to the output of circuit S. A diode D17 is incorporated between the collector of transistor Tr6 and the cathode gate of thyristor Th and has the same conductivity direction as transistor Tr6. An RC series network R17, C12 is incorporated between the base of transistor Tr8 and the collector of transistor Tr7. Finally a resistor R18 connects the base of transistor Tr6 to a terminal A.

In the normal operating state transistor Tr6 is not conducting because terminal A is either not connected or is connected to a positive voltage. Diode D17 is not conductive and therefore thyristor Th does not conduct either. Consequently winding L10 remains currentless and capacitor C10 carries a d.c. voltage of, for example, approximately 7 V which is derived by means of diode D14 from the voltage across winding L9. A voltage of, for example, 5 V for a microprocessor in the control section of the receiver and for remote control is present across capacitor C11. Transistors Tr7 amd Tr8 also remain non-conductive.

The supply circuit is provided with a further secondary winding L11 of transformer T, a rectifier D18 and a smoothing capacitor C13 for controlling the output voltages of the circuit. By means of a voltage divider arranged in parallel with capacitor C5 and consisting of resistors R19, R20, R21 and R22, the base of an npn transistor Tr9, which is connected to the junction of resistors R20 and R21, is adjusted to a d.c. voltage which is proportional to the output voltage $V_o$ across capacitor C5. The emitter of transistor Tr9 is connected to Zener diode D16. By means of transistor Tr9 the voltage at the base is compared with the voltage of diode D16. The difference measured determines the collector current of a pnp transistor Tr10 whose emitter is connected to capacitor C13 and whose collector is connected via a resistor R23 to the anode of diode D8 and consequently determines the current through diode D8 and therefore the emitter current of transistor Tr5. If, for example, the output voltage increases as a result of a decreasing load and/or as a result of an increase of voltage $V_B$, the collector current of transistor Tr9 and hence the control current through diode D8 also increase. In the manner already explained this increase causes a reduction in the conductivity period of transistor Tr1, which counteracts the increase of the output voltage. An RC series network R24, C14 is incorporated between the base and the collector of transistor Tr10 for the purpose of reducing the loop gain at a high frequency and thus for improving the stability of the control. A diode D19, which is arranged between capacitor C6 and the junction of resistors R19 and R20, ensures a safeguard if diode D5, by means of which the highest output voltage $V_o$ is generated, becomes defective. In this case, in which diode D5 is interrupted, the voltage across capacitor C5 becomes zero. The control then attempts to increase this voltage, but this is prevented because D19 starts conducting so that now the voltage across capacitor C6 is controlled.

By connecting terminal A to ground the supply circuit of FIG. 1 is brought into the stand-by state during which most parts of the television receiver receive very little supply energy. Transistor Tr6 then starts conducting so that current flows via diode D17 to the cathode gate of thyristor Th which also starts conducting, while diode D14 is rendered non-conducting as will be further explained. A current flows through diode D15 to the base of transistor Tr8 which is rendered conducting so that transistor Tr7 also becomes conducting. The increase of the voltage at the collector of transistor Tr7 is passed on by the network R17, C12 to the base of transistor Tr8. Thus, transistor Tr7 and Tr8 constitute a monostable multivibrator which remains in its state reached during a period which is determined, inter alia, by the time constant of network R17, C12 even after the voltage $V_1$ across capacitor C10 has become low. By means of transistor Tr8 a part of voltage $V_1$ is compared with the voltage of Zener diode D16. The difference measured determines the collector current of transistor Tr7, which current flows through diode D8. The part of the circuit with winding L10 thus forms part of a control loop for maintaining voltage $V_1$ substantially constant, which control loop is put into operation by switching over to the stand-by state by means of terminal A.

The number of turns of winding L10 has been chosen so that, during the stand-by state, the output voltages of the supply circuit, i.e. the direct voltages derived from the other secondary windings L6, L7 and L11 are reduced to low values with little power being dissipated in the loads. This may be explained with reference to the following figures. When, for example, winding L6 has 44 turns, L7 has 7 turns, L9 has 2 turns and L10 has 15 turns, respectively, and when the voltage $V_o$ across capacitor C5 is approximately 140 V in the operating state, the voltage across capacitor C6 is: $(140 \times 7)/44 = 22.3$ V; the voltage across capacitor C10 is: $(140 \times 2)/44 = 6.4$ V and a direct voltage derived by rectification from winding L10 is $(140 \times 15)/44 = 47.7$ V. When in the stand-by state voltage $V_1$ is maintained at 8 V, a direct voltage derived by rectification from winding L9 would be $(8 \times 2)/15 = 1.1$ V which shows that diode D14 is not conducting, and the voltage across capacitor C6 is: $(8 \times 7)/15 = 3.7$ V, while the voltage across capacitor C5 is: $(8 \times 44)/15 = 23.5$ V. The latter two values are so low that a synchronizing circuit connected to capacitor C6 and a line deflection circuit connected to capacitor C5 cannot work properly, which causes a very low consumption. The output voltages are proportionally reduced and the different loads need not be turned off, while the voltage across capacitor C11 has substantially the same value as in the operating state.

Under these circumstances the conduction period of transistor Tr1, i.e. the interval between instants $t_5$ and $t_7$ in FIG. 2, is becoming increasingly shorter due to the operation of the control after a switch-over has been effected to the stand-by state. This conduction period has, however, a minimum value which is determined by the storage period of the charge carriers in transistor Tr1. During this period which cannot come, for example, below approximately 3 to 5 µs, the collector current of this transistor increases to a peak value which depends on the said period and also on voltage $V_B$ and which, similar to the storage period, is subject to variations caused by tolerances. Due to this current more energy is stored in transformer T than is extracted from it so that the output voltages tend to increase again after having been low. This is, however, prevented by the control mechanism where diode D8 causes such a high control current that transistor Tr1 is turned off and remains non-conducting because transistor Tr4 continuously remains conducting due to the large emitter current of transistor Tr5. In the stand-by state transistor Tr5 receives a collector voltage via resistor R9. The output voltage and also the control current then decrease again because capacitors C5, C6, C10 and C13 are discharged, more specifically until the voltage $V_1$ reaches a value at which the power supply circuit starts again. Transistor Tr1 becomes conducting in the manner already described, resulting in the capacitors on the secondary side of transformer T being charged again. An intermittent current flows through thyristor Th so that the voltage across capacitor C10 reaches a level at which transistor Tr8 is rendered conducting again, which restores the control loop. The process described is subsequently repeated.

It is evident from the foregoing that in the stand-by state the supply circuit of FIG. 1 is in a state in which a burst mode is generated, i.e. with an oscillation which is interrupted periodically, in which state very short current pulses flow through transistor Tr1 while the secondary voltages increase, whereafter the transistor is non-conducting while the secondary voltages decrease slowly. The advantage of such a burst mode is that the efficiency is then favourable. To ensure that the supply circuit continues to oscillate in the described manner in the stand-by state, that is to say, that it does not come into a continuous state, the monostable multivibrator comprising transistors Tr7 and Tr8 is provided, with which a hysteresis is obtained. Due to the hysteresis transistor Tr7 is maintained conducting for some time during which time a large current continues to flow through diode D8 so that transistor Tr1 remains non-conductive while the output voltages decrease. For the oscillation obtained a low frequency of approximately 100 Hz has been found in practice. A substantially constant voltage is obtained with the aid of circuit S for the voltage across capacitor C11.

It will be evident that variants which are not beyond the scope of the invention can be considered for the circuit described. This applies to, for example, transistor Tr1 which may be replaced by an equivalent power switch, for example, a gate turn-off switch. This also applies to a plurality of circuit-technical details, for example, the circuits for turning off transistor Tr1 or for turning on this transistor. For turning on transistor Tr1 at the desired instant winding L8 has been used in the foregoing, through which winding a current flows which has a similar variation to the current i through winding L1. Since current i flows through the parallel capacitor between instants $t_3$ and $t_5$, an image of this current may be obtained in a different manner, for example, by connecting this capacitor via a low-value resistor to ground, with the voltage across the resistor being the desired image.

Figure 3:
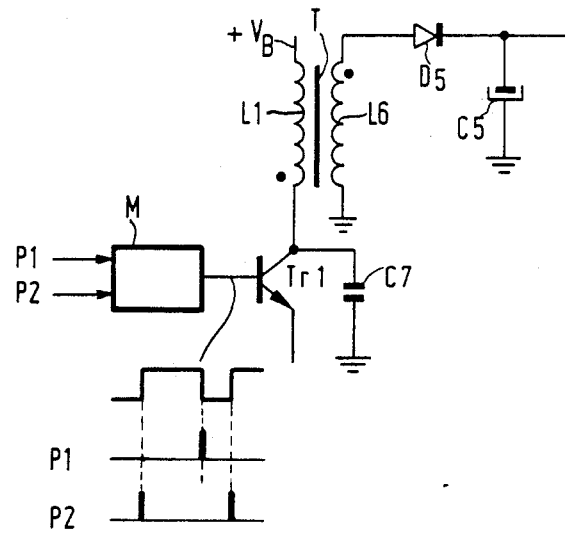
FIG. 3 shows a variant of a part of the circuit of FIG. 1.

It will be noted that the measure of reducing the turn-on losses of the power switch because of the turn-on being delayed until the instant when the voltage across the switch has a minimum value can be used in a similar manner as described above for non-oscillating power supply circuits. FIG. 3 very diagrammatically shows such a circuit in which only the same elements Tr1, L1, L6, D5, C5 and C7 as in FIG. 1 have been shown. A squarewave drive voltage is applied to the base of transistor Tr1 with the aid of an astable multivibrator M in FIG. 3. For this purpose multivibrator M receives two trigger pulses P1 and P2, with the leading edge of pulse P1, whose time position is determined by a control circuit, initiating the turn-off of transistor Tr1 and with the leading edge of pulse P2 initiating the turn-on. Since the same waveforms as in FIG. 2, under the same circumstances as in FIG. 1, also apply to the circuit of FIG. 3, pulse P2 can be generated by the same means as in FIG. 1 for rendering a switch having the same function as transistor Tr3 in FIG. 1 conductive for a short time. A variant of this measure, which may also be used in the circuit of FIG. 1, is the use of a level detector for determining the instant when the voltage at the collector of transistor Tr1 upon a decrease thereof after instant $t_3$ substantially reaches the value $V_B - nV_o$ and for delaying the turn-on until this instant. In another manner the leading edge of pulse P2 may be generated at the instant when the waveform of FIG. 2c drops below a predetermined level.

What is claimed is:

1. A switched-mode power supply circuit for converting a d.c. input voltage into a d.c. output voltage comprising: a controllable power switch connected in a series arrangement with a primary winding of a transformer, means coupling the series arrangement to input voltage terminals, said transformer having a secondary winding to which a rectifier is coupled for providing the output voltage, the primary winding forming part of a resonant circuit when the switch and rectifier pass no current, a drive circuit including a delay network connected to a control electrode of the switch for each time initiating turn-off of the switch, whereafter the voltage across the switch increases to a given value and substantially maintains said value, whereafter the said voltage decreases in accordance with an oscillation at a resonance frequency, and for each time initiating turn-on of the switch, whereafter the voltage across the switch is substantially zero, characterized in that the delay network is coupled to the control electrode of the power switch for each time adjusting the turn-on of said switch at an instant which is substantially half a cycle of the resonance frequency later than the initial instant of the decrease of the voltage across the switch during its previous cut-off time.

2. A power supply circuit as claimed in claim 1 wherein the delay network produces an output signal after the cut-off instant of the rectifier which operates as a cut-off signal for the power switch.

3. A power supply circuit as claimed in claim 1, wherein the delay network is coupled to a control electrode of a second switch which is conductive at the end of the conductive period of the power switch for initiating the turn-off of said power switch, characterized by means for each time making the second switch conduct substantially at the initial instant of the decrease of the voltage across the power switch and for subsequently maintaining the second switch in the conductive state during substantially half a cycle of the resonance frequency after the said instant.

4. A power supply circuit as claimed in claim 3, characterized in that the delay network is coupled to the second switch via a third switch which is conductive for maintaining the second switch in the conductive state.

5. A power supply circuit as claimed in claim 4, characterized in that the drive circuit also includes a second delay network for each time initiating turn-off of the power switch, said second delay network being connected to a point on a further secondary winding of the transformer, which point, during operation, develops a voltage of opposite polarity with respect to a voltage at a junction of the primary winding and the power switch, the second delay network being coupled to the control electrode of the second switch via a fourth switch which is conductive for cutting off the power switch.

6. A power supply circuit as claimed in claim 5 further comprising a starting resistor connected to the control electrode of the second switch, and wherein a control circuit for maintaining the output voltage substantially constant is connected to a control electrode of the fourth switch.

7. A power supply circuit as claimed in claim 4 further comprising a diode connected in series with the third switch in a drive path of the second switch, said diode having the same conductivity direction as the third switch.

8. A power supply circuit as claimed in claim 4 wherein said third switch comprises a transistor having an input diode and said delay network has an output, and means connecting a series arrangement of two diodes in parallel with the output of the delay network, said two diodes having the same conductivity direction as the input diode.

9. A power supply circuit as claimed in claim 1, wherein the delay network is connected to a further secondary winding of the transformer, characterized in that, during operation, a voltage at the junction of the delay network and said further secondary winding has the same polarity as a voltage at a junction of the primary winding and the power switch.

10. A power supply as claimed in claim 1 wherein the transformer comprises a further secondary winding coupled to the delay network and wound so that a voltage developed at a junction point of the delay network and the further secondary winding is of the same polarity as a voltage at a junction of the primary winding and the semiconductor power switch.

11. A switched mode power supply comprising: a pair of input terminals for a d.c. supply voltage, a transformer having a primary winding and at least one secondary winding, a controlled semiconductor power switch, means connecting said primary winding and said power switch in series circuit to said input terminals, a rectifier coupled to said secondary winding to develop a d.c. output voltage, capacitance means coupled to the primary winding to form a resonance circuit having a resonance frequency, a drive circuit including a delay network coupled to a control electrode of the power switch for initiating turn-on and turn-off of the power switch wherein on turn-off of the power switch the voltage across the power switch increases to a given value and then maintains said given value, said voltage subsequently decreasing with an oscillation characteristic at said resonance frequency, said delay network being operative to adjust turn-on of said power switch at an instant substantially half a cycle of the resonance frequency later than the instant at which the voltage across the power switch begins to decrease during the turn-off period of the power switch.

12. A power supply as claimed in claim 11 wherein the delay network is coupled to a control electrode of a second controlled semiconductor switch so as to make the second semiconductor switch turn on at the instant of said voltage decrease across the power switch and thereafter maintaining the second semiconductor switch conductive for half a cycle of the resonance frequency, and means coupling the second switch to the power switch so that conduction of the second switch initiates turn-off of the power switch.

* * * * *